Nov. 23, 1965

C. C. SIMS 3,219,970

UNDERWATER SOUND TRANSDUCER WITH RESONANT GAS BUBBLE

Filed Aug. 30, 1961

INVENTOR
CLAUDE C. SIMS

BY John E. Holford, Agent
Richard C. Reed

ATTORNEY

Nov. 23, 1965 C. C. SIMS 3,219,970
UNDERWATER SOUND TRANSDUCER WITH RESONANT GAS BUBBLE
Filed Aug. 30, 1961 4 Sheets-Sheet 2
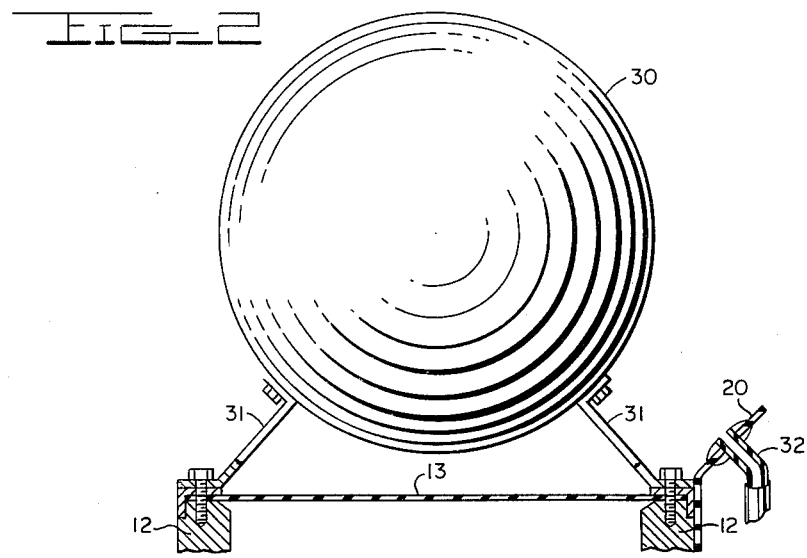
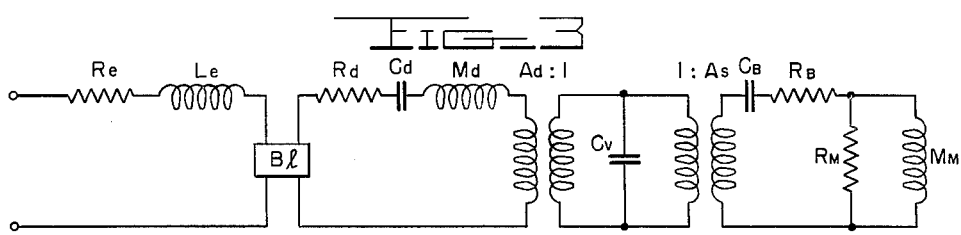
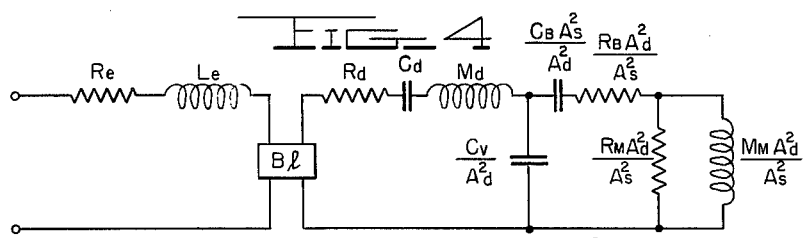
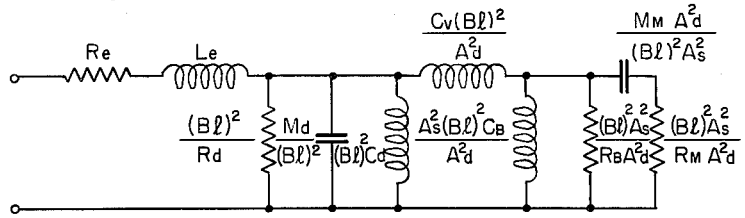
INVENTOR
CLAUDE C. SIMS
BY
ATTORNEY Nov. 23, 1965     C. C. SIMS     3,219,970
UNDERWATER SOUND TRANSDUCER WITH RESONANT GAS BUBBLE
Filed Aug. 30, 1961     4 Sheets-Sheet 3
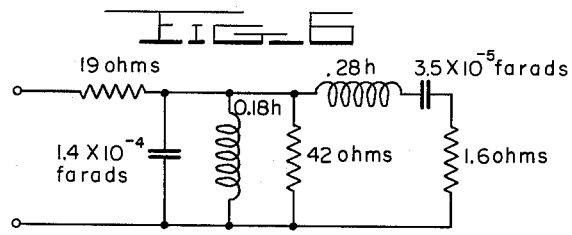
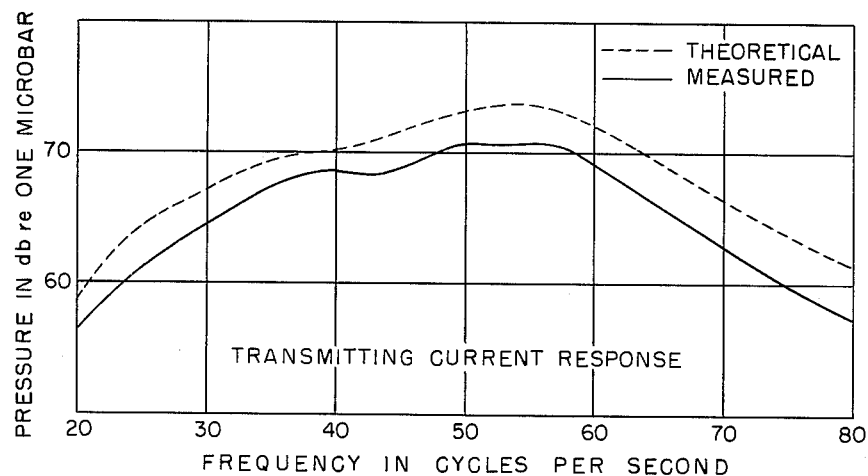
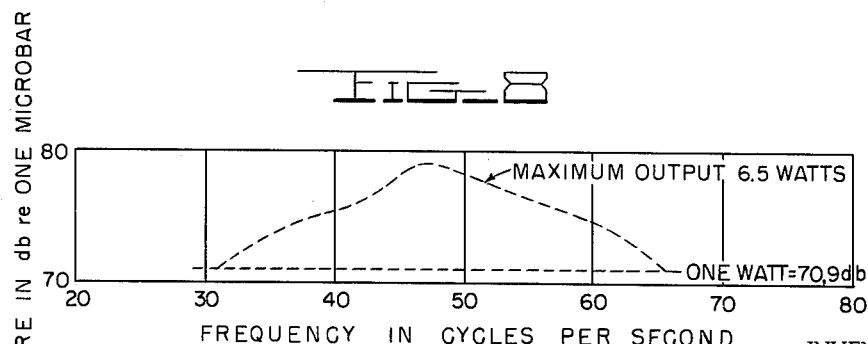
INVENTOR
CLAUDE C. SIMS
BY
ATTORNEY

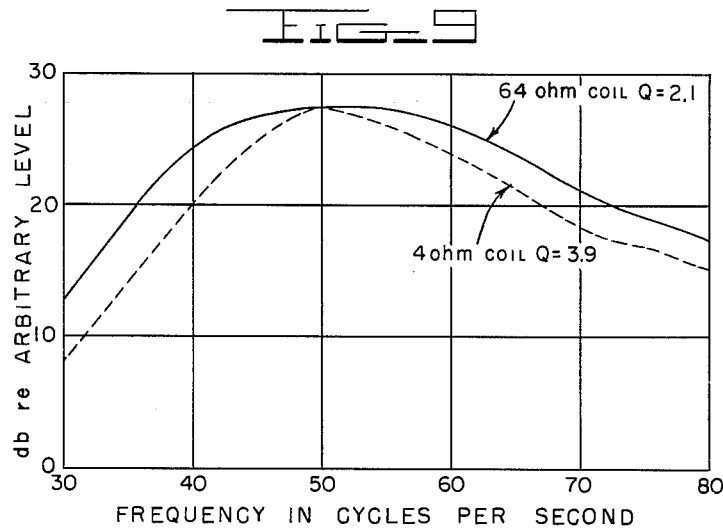
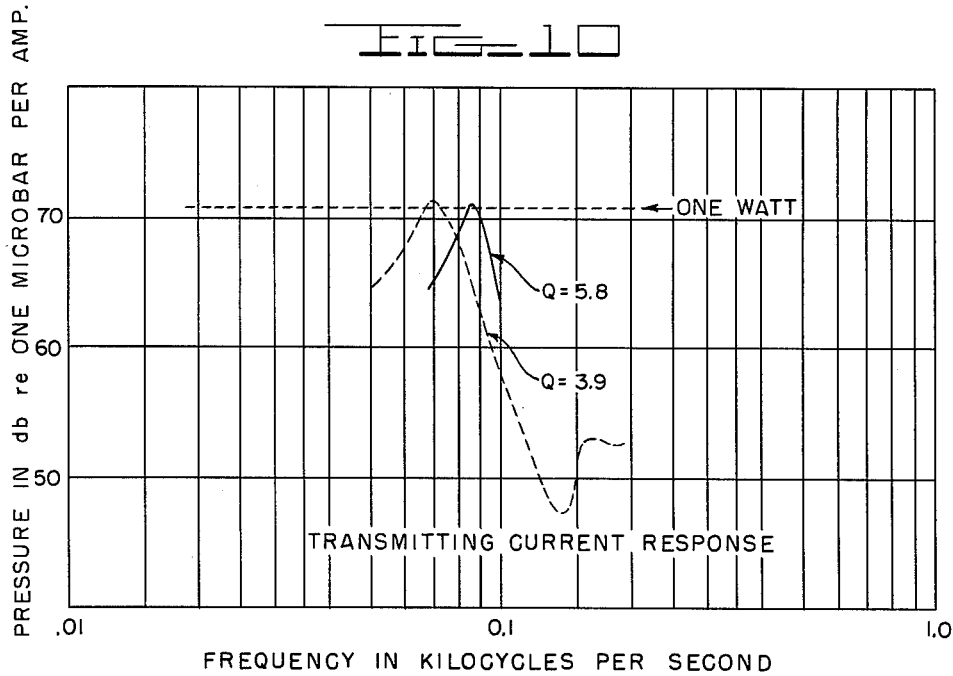

United States Patent Office 3,219,970
Patented Nov. 23, 1965

3,219,970
UNDERWATER SOUND TRANSDUCER WITH RESONANT GAS BUBBLE
Claude C. Sims, Orlando, Fla., assignor to the United States of America as represented by the Secretary of the Navy
Filed Aug. 30, 1961, Ser. No. 135,082
5 Claims. (Cl. 340—8)
(Granted under Title 35, U.S. Code (1952), sec. 266)

The invention described herein may be manufactured and used by or for the Government of the United States of America for governmental purposes without the payment of any royalties thereon or therefor.

The present invention relates to underwater transducers for converting electrical energy to sound or the reverse. More particularly the invention relates to transducers of the type described above which operate at very low frequency with high efficiency.

At very low frequencies presently available transducers become very inefficient. Crystal transducers, for example, have too small a displacement to put the necessary energy into the water. The same is true of transducers using the magnetostrictive principle. Mechanical transducers can place the necessary energy in the water, but they are bulky and non-reciprocal, i.e., they do not both send and receive signals. The most promising transducers at these frequencies are those which operate on electromagnetic principles.

Electromagnetic transducers fall into two general categories. One type, the variable reluctance transducer uses a movable diaphragm consisting, at least partly, of magnetic material. A stator, also including magnetic material, is placed near this diaphragm providing a complete magnetic circuit through the two, except for a relatively small air gap. An input winding is placed on the magnet circuit, usually on the stator. The diaphragm and stator are interconnected by springs so that the air gap may vary with changes in the input magnetizing current.

The variable reluctance transducer has certain limitations due to its inherent structure. The main difficulty with this type of transducer is that the air gap must be kept at a minimum to maintain a high level of flux in the magnetic circuit and the diaphragm displacement is determined by the air gap. The diaphragm is also necessarily a high mass which limits the useful frequency range.

The electrodynamic transducer is more easily designed for large linear diaphragm displacements, however, even these displacements are modest for delivering sound power at low frequencies by means of a diaphragm of reasonable size. A large diaphragm would have a large mass to provide the necessary rigidity, and this would raise the Q of the diaphragm to an objectionable degree. Flexural modes of a non-rigid diaphragm might be used, but these are high Q also and provide serious problems in proper loading and compensation of static pressure.

An object of the present invention is, therefore, to provide an underwater sound transducer for very low frequencies which is efficient and broadband.

A further object of the invention is to provide a transducer of the type described above wherein sound radiating from a rigid vibrating diaphragm is coupled to the surrounding water through a bubble of gas.

These and other objects and attendant advantages of the present invention will be better understood with reference to the following specification taken in conjunction with the accompanying drawings, wherein:

FIG. 2 shows additional structure which may be added to the structure in FIG. 1;

FIG. 3 shows a complete equivalent electrical circuit for the general type of structure in FIG. 1;

FIG. 4 shows a reduced form of the circuit in FIG. 3;

FIG. 5 shows a further simplified form of the circuits in FIGS. 3 and 4;

FIG. 6 shows an electrical analog of the specific transducer of FIG. 1;

FIG. 7 shows a graph comparing the measured response of the transducer in FIG. 1 as compared to its electrical analog in FIG. 6;

FIG. 8 shows a graph of maximum sound outputs as a function of frequency for 200 watts input to the transducer of FIG. 1;

FIG. 9 shows a graph of the sound output as a function of frequency for the transducer of FIG. 1 driven by high and low impedance drivers; and FIG. 10 shows a graph of the sound output vs. frequency on a logarithmic scale for two different volumes of the air mass selected for a higher frequency of operation.

Figure 1:
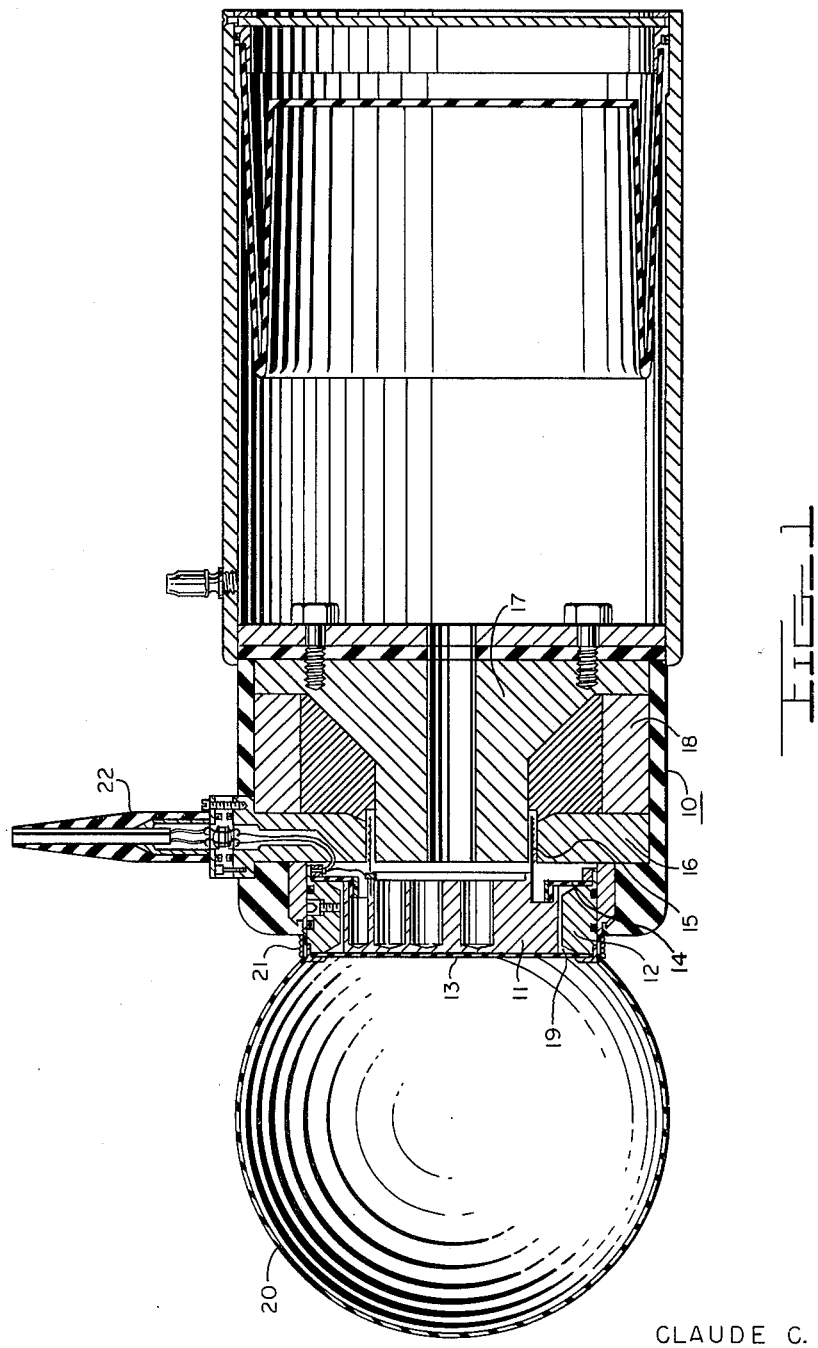
FIG. 1 shows a side view in section of a simple embodiment of the invention.

Referring to FIG. 1 there is shown one embodiment of the invention. This embodiment makes use of an electrodynamic driver 10 which is described in greater detail in applicant's copending patent application Serial No. 821,335 "Underwater Sound Transducer With Liquid Sealed Coupling Chamber," filed June 18, 1959. The driver employs a lightweight magnesium diaphragm 11 mounted in a housing ring 12. The diaphragm is supported by means of a thin layer of neoprene 13 cemented to the front face of the diaphragm and the housing ring. The space 19 between the diaphragm and housing ring is filled with castor oil and sealed with a neoprene washer 14.

The electrical motor of the driver is mounted directly behind the diaphragm. The hollow cylindrical permanent magnet 18 in conjunction with the annular pole piece 16 and conical pole piece 17 form the stator. A coil form and coil 15 are attached to the rear face of the diaphragm so that the coil extends between the pole pieces 16 and 17 forming an armature.

In the present invention a balloon 20 of flaccid resilient material, for example neoprene, is filled with gas and fitted over the housing ring 12 and sealed thereover by a clamping member, such as cord 21, to provide a gas bubble which contacts that portion of the neoprene layer 13 which covers the front face of the diaphragm. The gas bubble will have a resonant frequency in water which depends on the size of the bubble in air (atmospheric pressure) and the depth at which the transducer operates. This frequency is placed at the center of the desired operating frequency band. The bubble parameters are determined as follows for an air filled bubble.

The radiation acoustical impedance of the bubble, assuming the radiator is a pulsating sphere is given by Olson, "Elements of Acoustical Engineering," p. 94, as (1) $$Z_A = \frac{pc}{4\pi a^2}\left[\frac{(ka)^2 + j(ka)}{1 + (ka)^2}\right]$$

where:
$a$ = radius
$p$ = density of the water
$k = 2\pi/\lambda$
$\lambda$ = wavelength
$c$ = speed of sound in water
at low frequencies
where $1 \gg (ka)^2$ (2) $$Z_A = \frac{pc}{4\pi a^2}\left[\left(\frac{2\pi fa}{c}\right)^2 + j\left(\frac{2\pi fa}{c}\right)\right]$$
$$= \frac{p\pi f^2}{c} + j\frac{pf}{2a} = R_A + j\omega M_A$$

where the terms $j$, $w$ and $f$ represent, as usual, the orthogonal phase operator, angular frequency in radians and frequency in cycles-per-second respectively, and the terms $R_A$ and $M_A$ represent acoustic resistance and mass, respectively. The acoustic mass, $M_A$, is then $$\frac{p}{4\pi a}$$

For large radii where the equation of state is adiabatic and the surface tension negligible, the resonant frequency of a bubble, assuming the total mass is the water mass, the total compliance is the air compliance, is found from (3) $\quad C=\dfrac{V}{\gamma P}=\dfrac{4}{3}\dfrac{\pi a^3}{\gamma P}$ and $M_A=\dfrac{P}{4\pi a}$ where $C$ = compliance of air
$V$ = volume of sphere
$\gamma$ = ratio of specific heats of air
$P$ = static pressure The resonant frequency is then (4) $\quad f_o=\left[\dfrac{1}{\dfrac{p}{4\pi a}\dfrac{4\pi a^3}{3\gamma P}}\right]^{1/2}=\dfrac{1}{2\pi a}\left[\dfrac{3\gamma P}{P}\right]^{1/2}$ At atmospheric pressure (5) $\quad f_o=\dfrac{6.6}{d_o}$ c.p.s., $d_o$ is the diameter in meters.

(6) $\quad C=\dfrac{P_o V_o}{\gamma P^2}$ where $P_o$ = atmospheric pressure
$V_o$ = volume of bubble at atmospheric pressure since (7) $\quad P=P_o\left(1+\dfrac{h}{35}\right)$ where $h$ = depth in feet $$C=\dfrac{V_o}{\gamma P_o\left(1+\dfrac{h}{35}\right)^2}$$

and $$V=\dfrac{V_o}{\left(1+\dfrac{h}{35}\right)}=\dfrac{4}{3}\dfrac{\pi a_o^3}{\left(1+\dfrac{h}{35}\right)}=\dfrac{4}{3}\pi a^3$$

where (8) $\quad a=\dfrac{a_o}{\left(1+\dfrac{h}{35}\right)^{1/3}}$

The acoustic mass at operating depth is then (9) $\quad \dfrac{p}{4\pi\dfrac{a_o}{\left(1+\dfrac{h}{35}\right)^{1/3}}}=\dfrac{p\left(1+\dfrac{h}{35}\right)^{1/3}}{4\pi a_o}$ The resonant frequency at operating depth is $$f_h=\dfrac{1}{2\pi}\left[\dfrac{3\gamma}{p}\dfrac{P_o\left(1+\dfrac{h}{35}\right)}{\left[\dfrac{a_o}{\left(1+\dfrac{h}{35}\right)^{1/3}}\right]^2}\right]^{1/2}=\left[\dfrac{1}{2\pi}\dfrac{3\gamma P_o}{pa_o^2}\right]^{1/2}\left[1+\dfrac{h}{35}\right]^{5/6}$$

(10) $\quad f_h=\dfrac{6.6}{d_o}\left[1+\dfrac{h}{35}\right]^{5/6}$

To find the Q of the bubble assuming the radiation resistance is the total dissipation from Equation 2

(11) $\quad Q=\dfrac{\omega M_A}{R_A}=\dfrac{\dfrac{pf}{2a}}{\dfrac{p\pi f^2}{c}}=\dfrac{c}{2\pi fa}=\dfrac{1}{ka}$ This is interesting in that the product of the wave number of a sphere and its radius is always $\tfrac{1}{2}Q$.

$$Q=\dfrac{c}{2\pi fa}$$

where $f$ is $f_h$ and $a$ is the radius at operating depth so $$f_h=\dfrac{1}{2\pi a}\left[\dfrac{3\gamma P}{p}\right]^{1/2}$$

$$Q=\dfrac{c}{2\pi\dfrac{a}{2\pi a}\left[\dfrac{3\gamma P}{p}\right]^{1/2}}=\left[\dfrac{pc}{3\gamma p}\right]^{1/2}$$

$$P=P_o\left(1+\dfrac{h}{35}\right)$$

then

(12) $\quad Q=\left[\dfrac{pc^2}{3\gamma P_o\left(1+\dfrac{h}{35}\right)}\right]^{1/2}=72\left(1+\dfrac{h}{35}\right)^{-1/2}$ The Q of the bubble at resonance is dependent only upon the depth.

Since the resonant frequency of the transducer depends on the air volume, and the radiating surface governs the radiation load, there is available some flexibility in controlling the Q.

At low frequencies the acoustic radiation resistance for any omnidirectional pulsating object can be represented as $$R_A=f^2\dfrac{\pi p}{c}$$

The acoustic radiation mass is dependent on the area and to some degree on the shape.

As an example, the radiation mass of a sphere is at low frequencies $$M_s=\dfrac{p}{4\pi a_a}$$

where the area of the sphere is $A_s=4\pi a_s^2$

(13) $\quad M_s=\dfrac{p}{2(\pi A_s)^{1/2}}=\dfrac{.28p}{A_s^{1/2}}$

For a piston in an infinite tube the mass is $$M_P=\dfrac{.195p}{a_P}$$

$A_P$ = area of the piston = $\pi a_P^2$

(14) $\quad M_P=.195p\left[\dfrac{\pi}{A_P}\right]^{1/2}=\dfrac{.35p}{A_P^{1/2}}$ The value for M for most practical shapes will probably lie between these two values. The mass will be assumed to be

(15) $\quad M=\dfrac{K_1 p}{A^{1/2}}$ where $.28 < K_1 < .35$ depending on the shape.

Since the acoustic radiation resistance is dependent on A, the Q can be controlled by varying A.

FIG. 2 shows a modification of the FIG. 1 structure wherein the resonant frequency of the bubble is adjustable and the Q decreased. To vary the resonant frequency of the bubble a flexible conduit 32 is inserted through the wall of the balloon 20 and sealed thereto. The opposite end of the conduit is connected through appropriate valves to a conventional source of compressed air (not shown) so that gas may be added or removed. The conduit is preferably combined with the electrical cable 22 leading to the transducer. If desired, the conduit may enter the transducer with the cable and pass through the housing ring into the bubble. The Q of the bubble has been decreased by mounting a rigid sphere 30 on the ring housing 12 by means of a plurality of studs 31. The sphere is spaced from the balloon and the diaphragm and may be made from any rigid sound deflecting material, such as the material from which the diaphragm is made. The sphere may be solid or hollow with interior ribs to stiffen the exterior wall. The studs 31 will generally be of metal, although any material of suitable strength will do. If the volume of the studs is negligible compared to that of the sphere, their effect on the Q can be ignored.

FIG. 3 shows a general equivalent circiut for a gas bubble enclosed in a rubber membrane or balloon and mounted on an electrodynamic driver. The elements shown are:

$R_M$ = equivalent parallel mechanical radiation resistance
$M_M$ = equivalent parallel mechanical radiation mass
$R_B$ = mechanical dissipation in rubber membrane
$A_d$ = area of driver diaphragm
$A_s$ = area of bubble
$C_v$ = acoustic compliance of bubble
$C_B$ = mechanical compliance of rubber membrane
$C_d$ = mechanical compliance of diaphragm
$R_d$ = mechanical resistance of diaphragm where $M_d$ = mechanical mass of diaphragm
$Bl$ = product of flux density and wire length in magnetic gap = $F/i$
$R_e$ = electrical resistance of coil
$L_e$ = electrical inductance of coil The circuit in FIG. 3 may be reduced to the form shown in FIG. 4. It can be seen here, that at constant $Bli$ as the bubble approaches resonance, $i$ being the magnetizing current, the ratio of the linear velocity of the diaphragm to the linear velocity through the radiation load approaches unity, thus attaining large volume displacement of the bubble for small diaphragm displacements.

The circuit in FIG. 4 may be further reduced to the form shown in FIG. 5. This circuit may be used as the basis for determining a suitable analog circuit to represent the specific transducer in FIG. 1. The parameters of that transducer are as follows:

$B = 1.5$ webers/$M^2$
$l = 27M$ (approx.)
$A_d = 7.9 \times 10^{-3} M^2$
$R_e = 18$ ohms
$M_d = .22$ kg.
$Bl = 40$
$(Bl)^2 = 1600$
$(A_d)^2 = 6.2 \times 10^{-5}$ (approx.)

$Cd = \dfrac{1}{\omega_d^2 M_d}$ where $\omega_d$ is $2\pi f_d$; $f_d = 33$ c.p.s.

the unloaded resonance of the diaphragm.

$C_d = 1.1 \times 10^{-4} M$/newton $$R_d = \frac{\omega_d M_d}{Q_d}$$

where $Q_d = 1.2$
$R_d = 38$ MKS. acoustic ohms

Assume the bubble resonance at 14 ft. depth to be 50 c.p.s., then from equation 5

$$d_o = \frac{6.6}{f_h}\left(1 + \frac{h}{35}\right)^{5/6} = 0.19 M$$

$$a_o = 0.10 M$$

$$\frac{M_M}{(A_s)^2} = \frac{p\left(1 + \dfrac{h}{35}\right)^{1/3}}{4\pi a_o} = 900 \, kg./M^4$$

$$C_v = \frac{1}{\omega_k^2 M_A} = \frac{1}{(2\pi)^2(50)^2(900)} = 1.1 \times 10^{-8} M^5/\text{newton}$$

$$\frac{R_M}{(A_s)^2} = \frac{pc}{4\pi a^2} = \frac{pc}{4\pi\left[\dfrac{a_o^2}{\left(1+\dfrac{h}{35}\right)^{2/3}}\right]}$$

The value for the stiffness in the rubber is considered to be negligible compared to the stiffness in the air from the following analysis:

The surface tension enters into bubble theory as added stiffness. The total stiffness is $$k' = \frac{\gamma P_o}{V_o \alpha}\left[1 + \frac{2\sigma}{P_o a_o} - \frac{2\sigma}{3\, \eta\, P_o a_o}\right]$$

where $\sigma$ is the surface tension, $\alpha$ is a factor that describes the departure of the bubble stiffness from the adiabatic stiffness, and $\eta$ is the polytrophic exponent;

for large radii $\alpha = 1$, $\eta = \gamma$ as $$k' = k\left[1 + \frac{2}{P_o a_o} - \frac{2}{2\gamma P_o a_o}\right]$$

Where $k$ is the stiffness of the air.

The excess static pressure inside the balloon is $$\Delta P = \frac{2\sigma}{a_o}$$

therefore $$k' = k\left[1 + \frac{\Delta P}{P_o} - \frac{\Delta P}{3\gamma P_o}\right] = k\left[1 + \frac{\Delta P}{P_o}\left(1 - \frac{1}{3(1.4)}\right)\right]$$

$$= k\left[1 + -76\frac{\Delta P}{P_o}\right]$$

For the weather balloon $$\frac{P}{P_o} = .008$$

so the stiffness of the rubber is negligible.

The electrical equivalent of the transducer is then, $R_e = 19$; $L^e$ is negligible $$\frac{(Bl)^2}{R_d} = \frac{1600}{38} = 42 \text{ ohms}$$

$$\frac{M_d}{(Bl)^2} = \frac{0.22}{1600} = 0.14 \times 10^{-3} \text{ farads}$$

$$(Bl)^2 C_d = 1600(1.1 \times 10^{-4}) = 0.28 \text{ henries}$$

$$\frac{C_v(Bl)^2}{(A_d)^2} = \frac{1.1 \times 10^{-8}(1600)}{6.2 \times 10^{-5}} = 0.28 \text{ henries}$$

$$\frac{M_M(A_d)^2}{(Bl)^2(A_s)^2} = \frac{900(6.2 \times 10^{-5})}{1600} = 3.5 \times 10^{-5} \text{ farads}$$

$$\frac{(Bl)^2(A_s)^2}{R_M(A_d)^2} = \frac{1600}{1.6 \times 10^7 \times 6.2 \times 10^{-5}} = 1.6 \text{ ohms}$$

An analog circuit as shown in FIG. 6 was made using these parameters with the frequency scaled to 50 kc. The value of the capacitor representing the radiation mass had to be increased to $4.6 \times 10^{-2}$ mfd. and the resistance lowered to 1.4 ohms to correct for the part of the sphere which is not contributing radiation, i.e., that part where the diaphragm is located.

FIG. 7 shows the measured response (solid curve) compared to the response of the analog circuit (dashed curve). The response of the analog is about the same shape as the measured value, however, it is between 2 db and 3 db higher in level. This can be accounted for by: dissipation in the air and rubber which has been ignored; there is a possibility of some error in the B$l$ factor, which was not carefully measured; the presence of the surface lowers the pressure about 1 db at 60 c.p.s.; measurement errors due to distance, electronics, etc. The agreement between the analog and measured values is sufficient to be reasonably confident of the circuit.

FIG. 8 gives the maximum output obtainable with about 200 watts into the projector. The efficiency of the bubble was measured to be from 3 to 5 percent depending on driving power. The theoretical efficiency assuming no mechanical loss in the bubble or driver is $$\frac{R_A}{R_e+R_A}(100)=\frac{1.4(100)}{19+1.4}-7\%$$

FIG. 9 shows the relative sound pressure generated by the transducer when driven with 4 ohms (dashed curve) and 64 ohms (solid curve). These curves show that the band width can be increased by increasing the resistance of the generator. This is to be expected because the radiating bubble appears as a series resonance in the circuit. This means that the band width can be directly controlled by the generator impedance. The conventional electrodynamic transducer behaves in the opposite manner because the diaphragm and load appears as an anti-resonant circuit. It is seen also that as the resonant frequency goes down the area increases so the radiation resistance increases, which improves the output.

FIG. 10 shows the behavior of the transducer at a higher frequency. In this case the rubber membrane was 1/16" thick and was adding some stiffness. The two curves show the output with different air volumes, the solid curve representing the smaller volume with the highest resonant frequency and Q.

The above disclosed embodiments are merely exemplary and do not represent the intended scope of the invention. The transducer used was broad band and no attempt was made to redesign it for improved efficiency with the bubble. Some of the changes which would improve its efficiency involve reducing the mass of the diaphragm, tuning the diaphragm resonance to that of the bubble, reducing losses in the electrical side of the transducer, replacing the permanent magnet with an electromagnetic one, and lowering the value of the dissipative element in the diaphragm system. The performance can also be improved by using gas other than air to reduce viscous losses.

What I claim is:

1. An underwater transducer comprising a rigid walled housing having an opening in one wall, a diaphragm with an external radiating face located within said opening; a thin layer of resilient material cemented to said housing and at least a portion of said radiating face, said material entirely covering the portion of said opening between said housing and diaphragm; motor means within said housing coupled to said diaphragm for moving said diaphragm normal to said radiating wall; a substantially spherical bubble of gas having a portion of its surface in contact with the entire portion of resilient material which is cemented to said radiating face; and a flaccid resilient membrane covering substantially all of the remaining surface of said gas, said membrane being sealed to said housing.

2. The transducer according to claim 1 wherein said resilient material is cemented over said entire radiating face.

3. A transducer according to claim 1 wherein said transducer is designed to operate at a given depth in water, said diaphragm is resiliently mounted in said transducer to vibrate at a specific natural frequency, and said bubble of gas is proportioned to vibrate at said selected frequency under the pressure found at said given depth.

4. A transducer according to claim 1 wherein a rigid body having an enclosed volume equal to a substantial fraction of the volume of said gas bubble is mounted on said housing within and spaced from said membrane.

5. A transducer according to claim 1 including an external source of compressed gas, conduit means attached to said source and said transducer for transmitting gas between said bubble of gas and said external gas source.

References Cited by the Examiner
UNITED STATES PATENTS

| | | | |
|---|---|---|---|
| 868,880 | 10/1907 | Mundy | 340—13 X |
| 1,563,626 | 12/1925 | Hecht et al. | |
| 1,624,412 | 4/1927 | Horton | 340—13 |
| 2,164,858 | 7/1939 | West | 340—12 |
| 2,390,847 | 12/1945 | Olson. | |
| 2,552,970 | 5/1951 | Horseley et al. | |
| 2,558,089 | 6/1951 | Horseley et al. | |
| 2,756,405 | 7/1956 | Harris | 340—8 |
| 2,829,520 | 4/1958 | Stanton. | |

CHESTER L. JUSTUS, *Primary Examiner.*

LEWIS H. MYERS, *Examiner.*